United States Patent [19]
Gibson

[11] Patent Number: 5,051,042
[45] Date of Patent: Sep. 24, 1991

[54] DUAL DOWELLING JIG

[75] Inventor: Jeremy H. Gibson, Eastlake, Ohio

[73] Assignee: Leichtung, Inc., Cleveland, Ohio

[21] Appl. No.: 494,557

[22] Filed: Mar. 16, 1990

[51] Int. Cl.⁵ ............................................. B23B 49/04
[52] U.S. Cl. .................................. 408/72 R; 408/108; 408/109; 408/115 R
[58] Field of Search ............... 408/108, 107, 106, 105, 408/104, 103, 109, 72 R, 72 B, 115 R, 115 B; 33/666, 670, 673; 269/87.3

[56] References Cited
U.S. PATENT DOCUMENTS 4,884,926 12/1989 Gibson ............................. 408/115 R
4,923,340 5/1990 Hegedusch ....................... 408/72 R

FOREIGN PATENT DOCUMENTS 1168349 7/1985 U.S.S.R. .......................... 408/115 B

Primary Examiner—Z. R. Bilinsky
Attorney, Agent, or Firm—Frank B. Robb

[57] ABSTRACT

A dual dowelling jig having clamping parts for a pair of boards or the like with articulating connections at the ends of the parts which connections include drill guides, the drill guides being arranged to locate holes in the boards precisely opposite one another and equi-distantly spaced to in turn provide for the insertion of dowels in holes drilled through the guides and subsequently locate the boards for gluing and thus fastening them in planar and edge to edge alignment.

10 Claims, 1 Drawing Sheet

DUAL DOWELLING JIG

GENERAL DESCRIPTION OF THE INVENTION

The invention hereof includes a simple construction which includes clamping elements guided with respect to one another and adapted to grip boards in edge to edge parallel relationship with certain spacer parts therebetween, with articulating connections of the spacer parts and clamp bodies, suitable holes being provided in certain links to cause the positioning of dowel holes in board edges at precisely opposite positions and in spaced relationship along the edge of the board.

The dowelling art is well known and thus is not dealt with except to note that there are of course many different versions of dowelling jigs of one kind or another and all have their particular purposes the instant invention having its primary purpose to provide a simple structure which will cause the drilling of holes time after time in the same relationship and in precisely aligned manner for the desired ultimate planar positioning of boards with regard to one another.

THE PRIOR ART

There are many examples of dowelling jigs in the prior patented art such as that of Long, U.S. Pat. No. 2,470,038 which provides for clamping a pair of boards while drilling aligned holes but lacks self positioning means and requires locating the drill holes by eye or equivalent measuring means.

Saunders, U.S. Pat. No. 2,783,665 is an example of clamping means for holding but a single board, with location of only a single hole at a time, not two boards for identical positioning or subsequent matching more than a single dowel hole.

The patent of Silken, U.S. Pat. No. 3,674,376 provides means to drill holes in a pair of boards but requires positioning of the drill guide for each hole.

The problem arising in Lindblad, U.S. Pat. No. 4,421,442 is that while holes may be drilled using this device in adjacent boards clamped together, there is no means to assure that if the boards are of different thicknesses, the drill will make holes in the same planar relationship for the ultimate positioning of the boards.

The articulated jig of Wilcox, U.S. Pat. No. 4,669,926 is not really useful for drilling dowel holes, where planar alignment is sought and particularly where sets of holes bearing the same relationship to one another are required.

Other variations such as that of Aerni et al., U.S. Pat. No. 4,730,959 may be useful for particular circumstances, but that patent does not provide compensation for different thicknesses of boards, where planar alignment of the surfaces is necessary or desirable.

There are other examples of dowelling jigs, but I do not know of any more pertinent than these with the possible exception of my own prior application, now U.S. Pat. No. 4,884,926 which is a much more complex device and is subject to error unless very precise machining of the parts is effected.

Further, that device actually requires more parts and performs its operation best where uniform spacing of the dowel holes is required or desirable, the instant jig differing in that the spacing of the holes in the board edges will be different for different thicknesses of boards with precise resetting of the new device not being required unless precise positioning of the holes is in fact demanded.

GENERAL DESCRIPTION OF THE INVENTION

With the foregoing in mind, the invention hereof includes as has been previously suggested an articulated arrangement with clamping means to position a pair of boards or the like with separating parts provided and the ability to drill pairs of holes in precise alignment precisely in the mid edge of each board as is most always required and demanded where dowelling is to be effected.

With that general summary of the invention in mind, it is pointed out that the same is carried out by the mechanism disclosed in the drawing and shown in FIG. 1 wherein the same is a plan view of the device of my invention in full lines with the innermost position which can be assumed and in dotted lines, fragmentary in nature, the outward extended position of a portion of the device is disclosed.

Figures 1, 3:
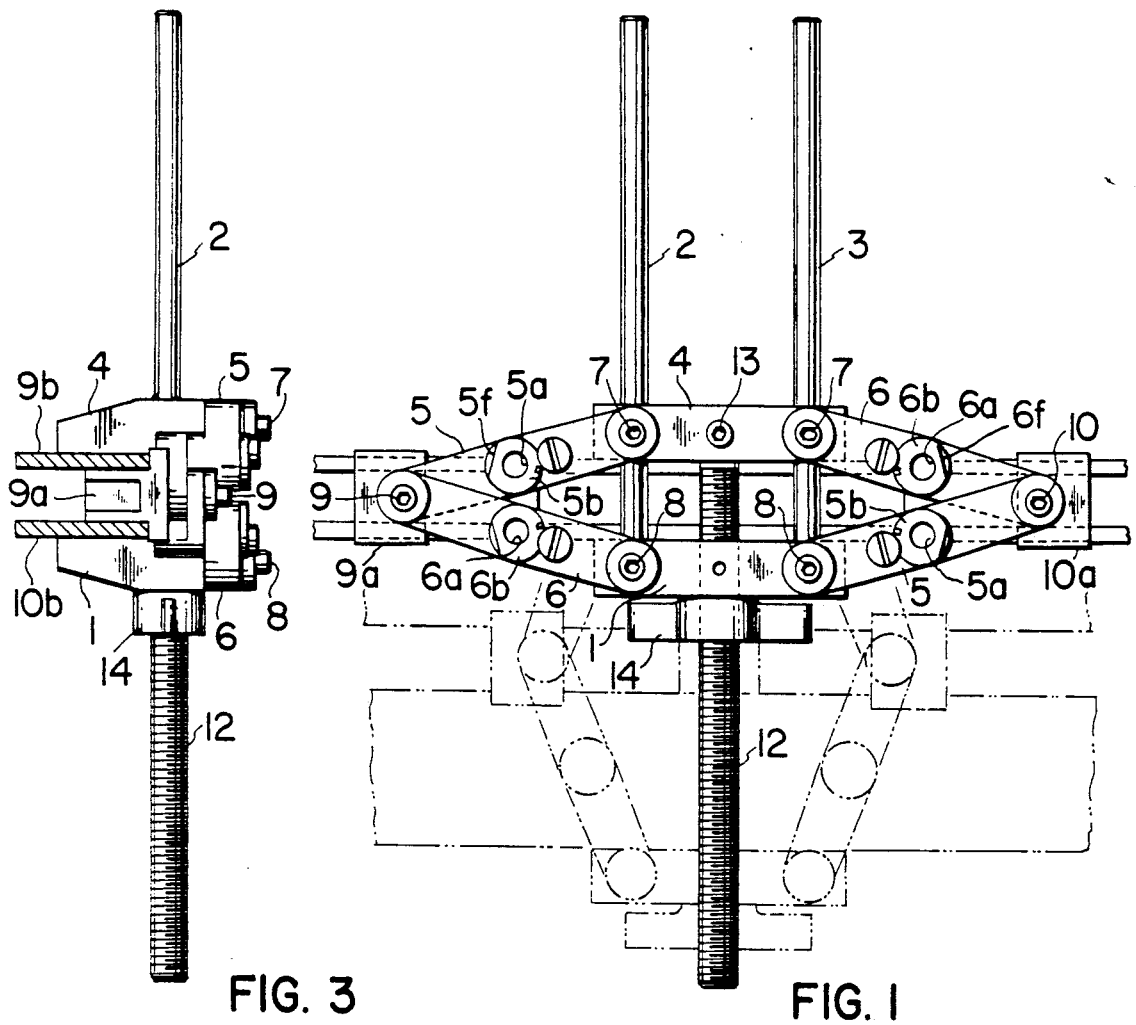
FIG. 3 is an end or side view of FIG. 1 disclosing further the arrangement of the parts in their innermost position.
Figure 2:
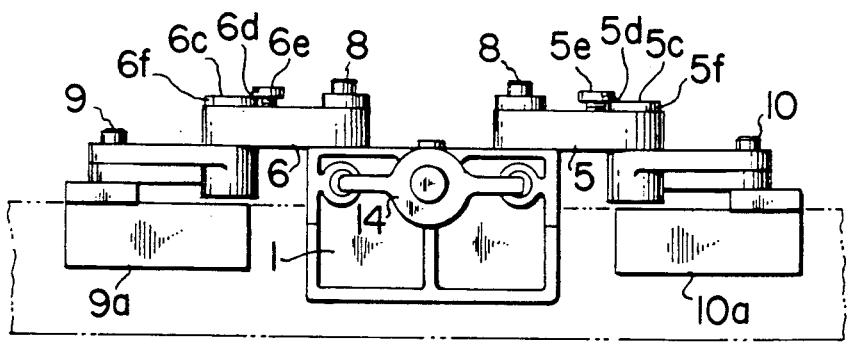
FIG. 2 is a view looking about in the direction of the edge so to speak of FIG. 1 and illustrating the relationship and form of the parts including the links and clamping parts provided.

Turning now to FIG. 1, the device hereof is shown as comprising a first clamp body generally designated 1, from which extend a pair of guide rods 2 and 3 on which is mounted a second clamp body 4 for movement back and forth with regard to the first body 1 mentioned.

Suitably arranged with respect to the clamp bodies 1 and 4, are the pair of first rigid links designated 5 which links are identical and other rigid links 6, which are also themselves identical but differ slightly from the links 5 previously mentioned.

As will be understood from a consideration of this figure, the links 5 and 6 are pivotally connected at 7 and 8 respectively on the clamp bodies 4 and 1 respectively, and in turn connected at their outer extremities at 9 and 10.

Suitably depending from and pivotally connected with the same pivots 9 and 10 are the spacer parts 9a and 10a, these being arranged to separate boards which are clamped between the clamp bodies in a manner to be subsequently explained.

In each of the links 5 and 6, there are provided about midway thereof the drill guide openings 5a for the links 5 and 6a for the links 6, in which openings are positioned certain drill bushings to be more specifically described designated 5b for the links 5 and 6b for the links 6.

It should be explained that these bushings are removable from the base main holes in the links and provide for the use of different size drills, these bushings being in turn each equipped with a flange such as 5c for the bushing 5b and 6c for the bushing 6b.

These flanges 5c and 6c are in turn equipped with suitable detents 5d and 6d respectively, which are identical and the flanges are of identical form, each with a suitable flat head screw 5e and 6e positioned to retain the bushings 5b and 6b in place. These screws will thus prevent the withdrawal of the respective bushings, until the bushings are rotated to present a flat surface 5f or d 6f provided on each respectively to a position whereby the flat surface is opposite the particular screw head, after which the bushing may be withdrawn.

Since the detents 5d and 6d extend upward out of the surface of the bushings flanges those detents will inhibit the rotation of such bushings by impingement against the heads of the respective screws which they adjoin.

Turning now to a consideration of the balance of the structure, it will be noted that if it is desired to clamp a pair of boards such as suggested in FIG. 3, the boards being designated 9b and 10b for example, the same will be positioned as shown, with the inner faces against the outer surfaces of the spacer parts 9a and 10a, and the boards outer surfaces against the inner sides of the clamp bodies 1 and 4. Thereafter a screw 12, which is positioned so as to connect at 13 to the clamp body 4 and pass through the clamp body 1 will be acted on by a thumb screw 14 which is suitably rotated for that purpose. This will cause the clamp parts 1 and 4 to be drawn toward one another thereby clamping boards 9b and 10b.

The action just described provides for movement of the drill bushings in uniform paths in which the bushings 5a and 6a of each of the respective links, not only move toward one another parallel to the guide rods 2 and 3 during board clamping movement, but during such movement those bushings also move away from the bushings 5a and 6a on the other side of the guide rods 2 and 3.

Those movements will be seen to be in uniform increments and identical paths toward and from one another controlled by the lengths and pivotal connections of the links in which they are positioned.

It is obvious that different thicknesses of boards 9b and 10b may be clamped thus requiring only that the clamp parts 1 and 4 be similarly positioned so as to engage the outer surfaces thereof with the spacer parts 9a and 10a properly positioned.

Thus it will be seen that suitably manipulating the boards into position and clamping the same appropriately will enable the same to be presented for drilling through the holes in the bushings previously mentioned and described in detail. Different thicknesses of boards will be accommodated so as to provide the holes to be drilled in the precise longitudinal edge centers in each case whereby subsequent emplacement of dowels in such holes drilled as will be clear from the foregoing and thus will enable the planar surfaces of the boards to be aligned when the dowels are appropriately assembled with the boards.

It is noted that the foregoing provides a simple construction of device which will accommodate a many different board thicknesses, with relatively limited complexity and certainly manipulability to effect the clamping and drilling operations.

I claim:

1. A dual dowelling jig comprising a first clamp body, guide means extending therefrom, a second clamp body mounted on the guide means to move toward and from the first body, means for moving said at least one clamp body toward the other, a pair of first rigid links connected to the clamp bodies, a pair of second rigid links likewise connected to the clamp bodies, each pair of links including a first and second link pivotally connected at their outer extremities at one end, and pivotally engaged with the clamp bodies at the other end, at points at their ends and at positions on the clamp body spaced from those of the first mentioned pair of links, drill guide openings in each link spaced equi-distantly from the pivotal connections of the extremities, movement of the clamp bodies toward and from one another causing movement of the drill guide openings in uniform paths to facilitate drilling aligned dowel holes in boards gripped by the clamp bodies.

2. A dual dowelling jig comprising a first clamp body, guide means extending therefrom, a second clamp body mounted on the guide means to move toward and from the first clamp body, means for moving said at least one clamp body toward the other, a pair of first and second links pivotally connected to the clamp bodies, another pair of first and second links likewise pivotally connected to the clamp bodies at positions spaced from the pair of first and second links, drill guide openings midway in said links and extending at right angles to the guide means aforesaid, the means to move the clamp bodies toward one another clamping boards or the like therebetween to facilitate drilling dowel holes in such boards in aligned spaced positions.

3. A jig as claimed in claim 1, wherein the first links are identical and connected to diagonally opposite ends of the first and second clamp bodies, the second links are identical and connected to other diagonally opposite ends of the clamp bodies, and the means for moving said at least one clamp body comprises screw means.

4. A jig as claimed in claim 2, wherein all the links are the same length from pivotal connection to pivotal connection, a pair being connected at the end of each clamp body, movement of one clamp body with respect to the other moving the drill guide openings in uniform relation, clamping of boards between said clamp bodies resulting in identical positioning of the drill guide openings for the same thickness of such boards, whereby drilling of equi-distantly spaced holes through the drill guide openings will also result in alignment of such holes.

5. A jig as claimed in claim 4, wherein the means for moving the clamp bodies are screw means, the links are identical in pivotal length, and movement of the clamp bodies causes the positions of the drill guide openings to move toward and from one another in proportion to the movement of said clamp bodies.

6. A jig as claimed in claim 4, wherein the drill guide openings are provided with removable drill guide bushings, the bushings each being restrained from removal by a flange, and a detent on the flange of each preventing rotation of the bushings.

7. A jig as claimed in claim 4, wherein the drill guide openings are provided with drill guide bushings, each said bushing including a sleeve-like body and a flange at one end seated at the guide opening, means adjacent the said opening to prevent accidental displacement of the bushing, and a formation on the flange to permit removal of the bushing when required.

8. A jig as claimed in claim 4, wherein the drill guide openings are provided with drill guide bushings, each said bushing including a sleeve-like body and a flange at one end seated at the guide opening, stop means on the flange impinging on the means adjacent the opening to prevent rotation of the bushing.

9. A jig as claimed in claim 4, wherein the drill guide openings are provided with drill guide bushings, each said bushing including a sleeve-like body and a flange at one end seated at the guide opening, means comprising a screw having a flat under head surface spaced from and over a part of the flange, said flange having a segment cut from its periphery to permit removal of the bushing when the cut portion of the flange is moved to a position to avoid the head of the screw aforesaid.

10. A jig as claimed in claim 4, wherein the drill guide openings are provided with drill guide bushings, each said bushing including a sleeve-like body and a flange at one end seated at the guide opening, means comprising a screw having a flat under head surface spaced from and over a part of the flange, said flange having a segment cut from its periphery to permit removal of the bushing when the cut portion of the flange is moved to a position to avoid the head of the screw aforesaid, and stop means on the flange impinging on the means adjacent the opening to prevent rotation of the bushing.

* * * * *